United States Patent [19]

Kawabe

[11] Patent Number: 5,462,251
[45] Date of Patent: Oct. 31, 1995

[54] METHOD AND APPARATUS FOR CONTROLLING THE FLOW OF FLUIDS

[76] Inventor: Ryu Kawabe, 3-7-301, Nagayama 3-chome, Tama-shi, Tokyo 206, Japan

[21] Appl. No.: 178,893

[22] Filed: Jan. 7, 1994

Related U.S. Application Data

[62] Division of Ser. No. 940,374, Sep. 3, 1992, Pat. No. 5,372,350.

[30] Foreign Application Priority Data

Sep. 3, 1991 [JP] Japan .................. 3-250353
Jul. 28, 1992 [JP] Japan .................. 4-220617

[51] Int. Cl.⁶ ............................................. F16K 7/04
[52] U.S. Cl. ................................... 251/4; 251/212
[58] Field of Search ........................... 251/4, 9, 212

[56] References Cited

U.S. PATENT DOCUMENTS

| | | |
|---|---|---|
| 1,858,352 | 5/1932 | Young . |
| 2,681,751 | 6/1954 | Stone et al. ............... 251/6 X |
| 2,721,052 | 10/1955 | Hull ............................ 251/6 |
| 3,102,710 | 9/1963 | Dresden . |
| 3,411,534 | 11/1968 | Rose . |
| 3,511,469 | 5/1970 | Bell . |
| 3,744,524 | 7/1973 | Blau . |
| 3,918,490 | 11/1975 | Goda . |
| 4,880,149 | 11/1989 | Scholefield et al. ....... 251/6 X |

FOREIGN PATENT DOCUMENTS

| | | |
|---|---|---|
| 619098 | 3/1927 | France . |
| 404271 | 10/1924 | Germany . |
| 845292 | 7/1952 | Germany . |
| 955750 | 1/1957 | Germany . |
| 3107352 | 9/1982 | Germany . |
| 8714457 | 12/1987 | Germany . |
| 2214271 | 8/1989 | United Kingdom ....... 251/6 |

*Primary Examiner*—John C. Fox
*Attorney, Agent, or Firm*—Wenderoth, Lind & Ponack

[57] ABSTRACT

A method and apparatus controls the flow rate of a fluid that flows through a fluid path including a resiliently deformable portion. A first roller has a cutout formed thereon on one side thereof, and a retainer is arranged in parallel with the first roller. The resiliently deformable portion of the fluid path is held between the first roller and the retainer. The first roller is rotatably supported by its rotary shaft. The first distance from the rotary shaft to the outer wall of the first roller on the side facing opposite the resiliently deformable portion may be varied in response to the variation in the angle that occurs when the first roller rotates about its rotary shaft. Thus, the second distance from the outer wall of the first roller on the side facing opposite the resiliently deformable portion to the retainer may be varied in response to the variation in the first distance, and the shape in cross section of the resiliently deformable portion may be varied according to the variation in the second distance. The flow rate of the fluid may be controlled by varying the shape in cross section of the resiliently deformable portion of the fluid path in this manner. The retainer may be replaced with a second roller having a configuration symmetrical with the first roller and being rotatably supported.

13 Claims, 14 Drawing Sheets

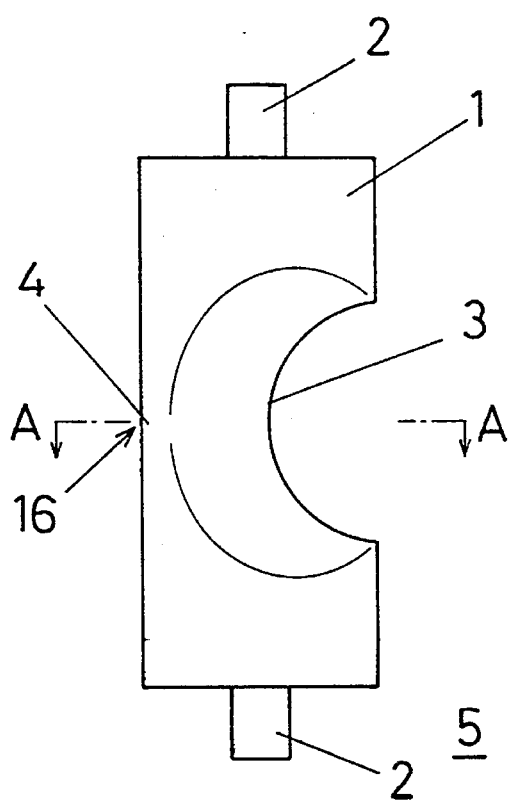
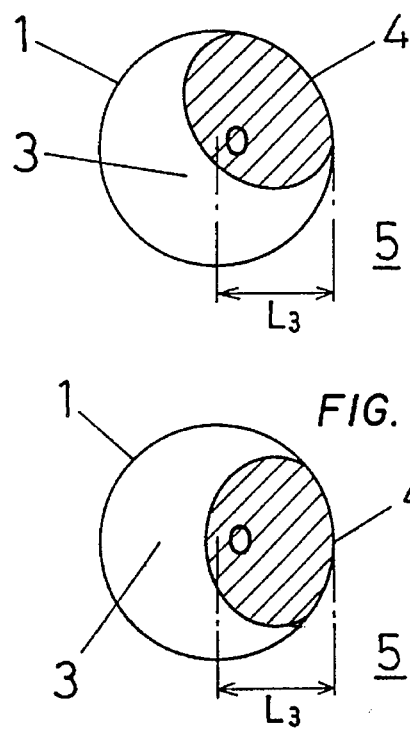
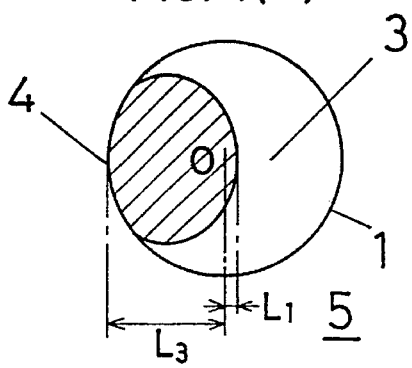
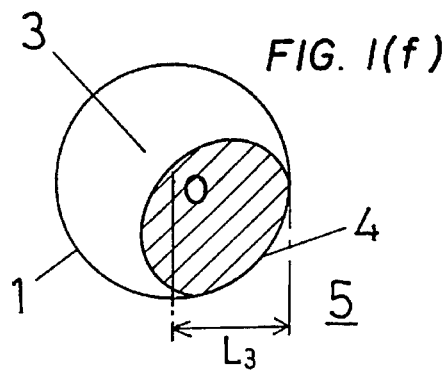
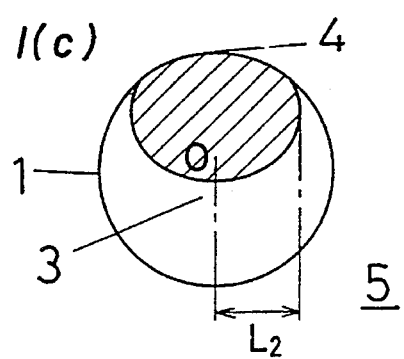
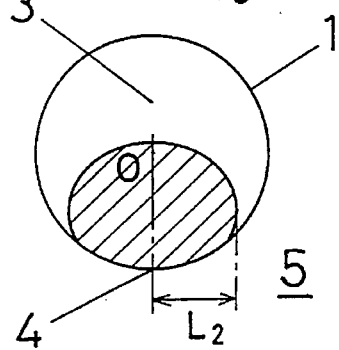

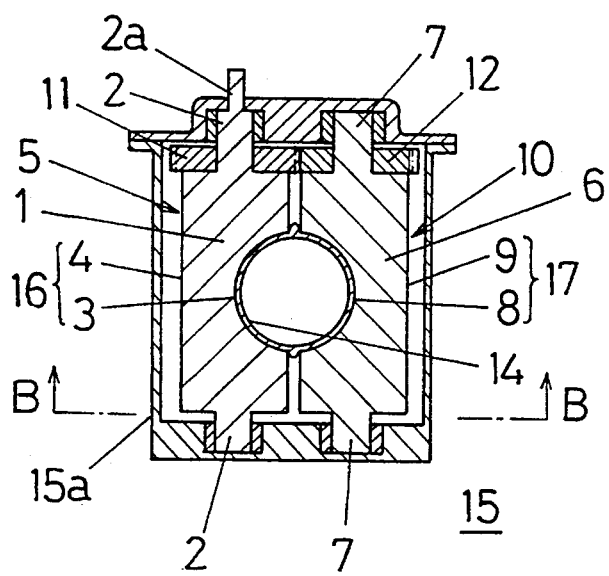
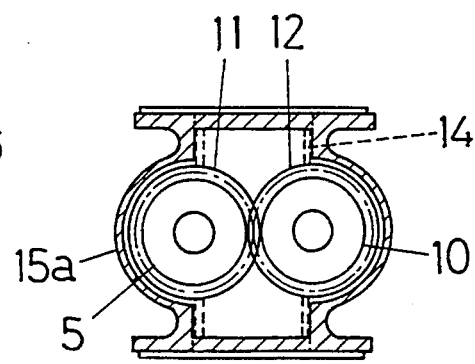
FIG. 2(a)  FIG. 2(b)
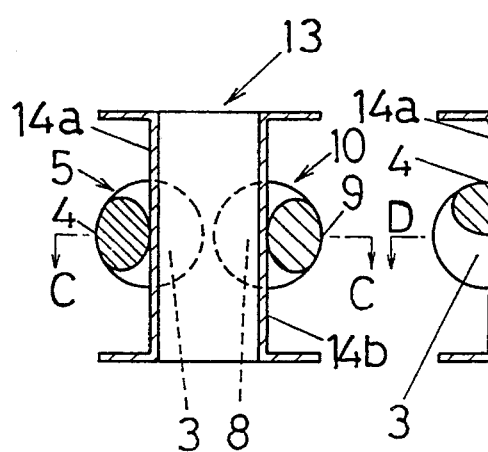
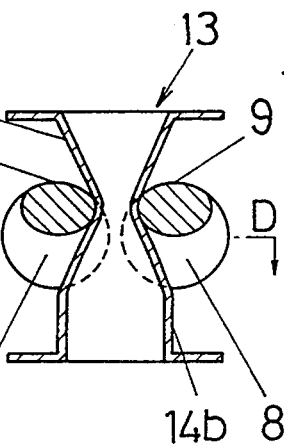
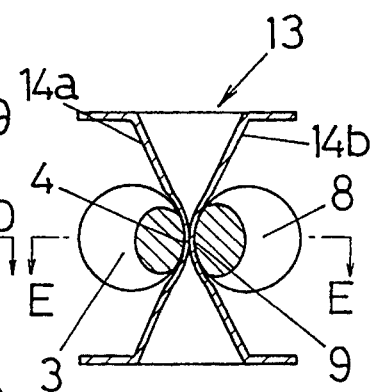
FIG. 3(a)  FIG. 3(b)  FIG. 3(c)

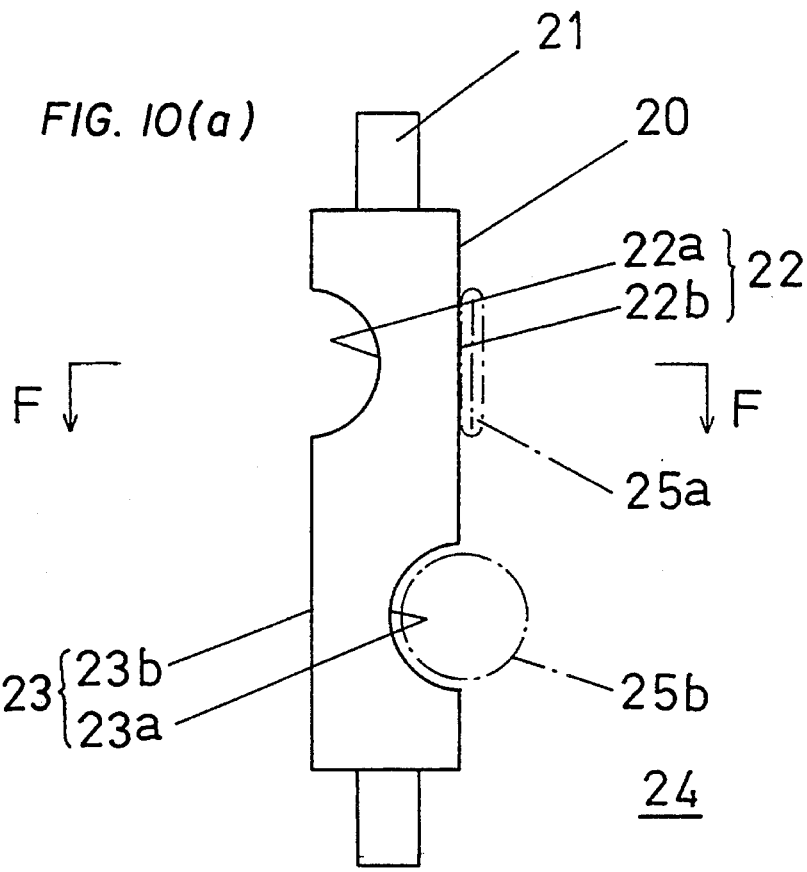
FIG. 10(a)
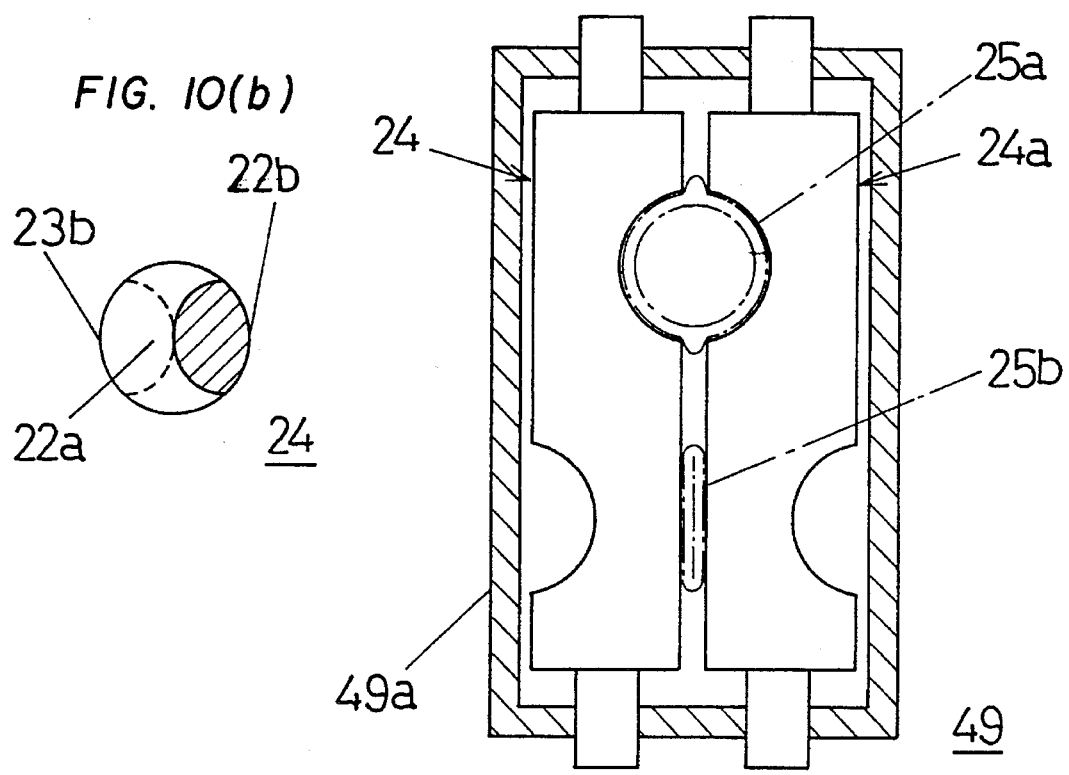
FIG. 10(b)
FIG. 10(c)

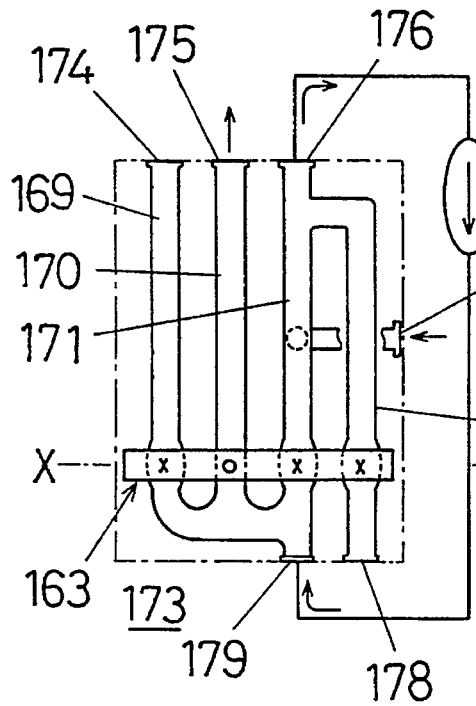
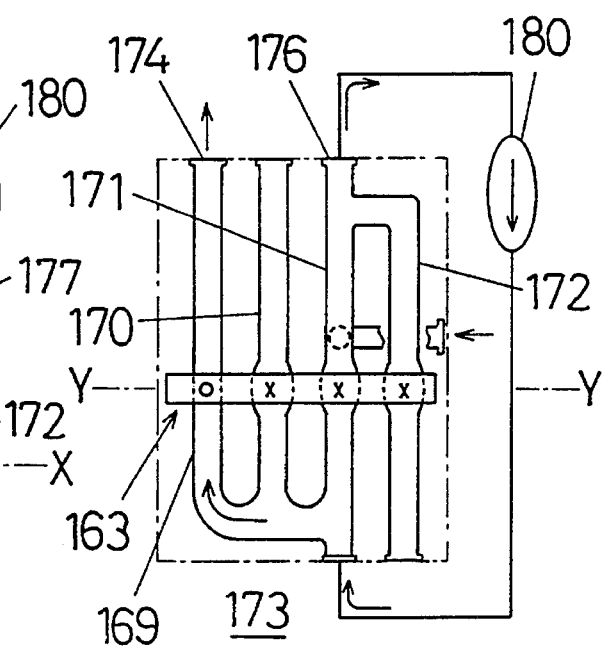
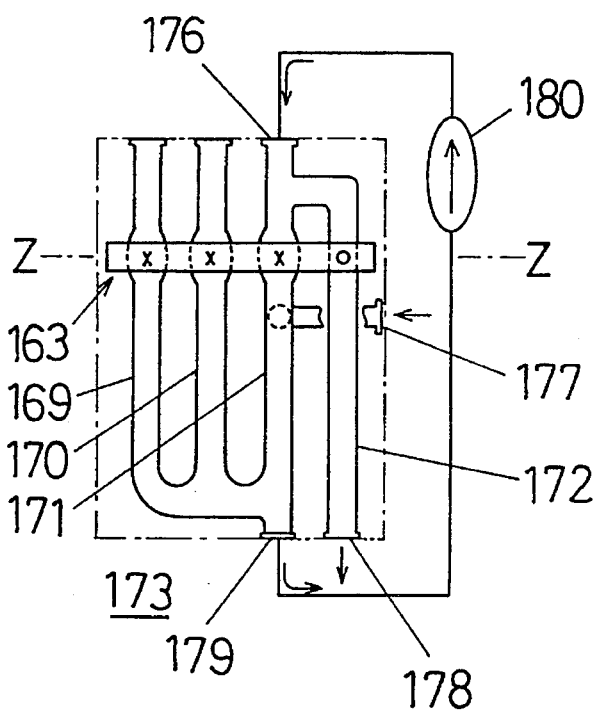
FIG. 15(a)
FIG. 15(b)
FIG. 15(c)

METHOD AND APPARATUS FOR CONTROLLING THE FLOW OF FLUIDS

This is a divisional application of Ser. No. 07/940,374, filed Sept. 3, 1992, U.S. Pat. No. 5,372,350.

BACKGROUND OF THE INVENTION

1. Field of the Invention

The present invention relates generally to a flow rate controller, and more particularly to a method of and an apparatus for controlling the flow rate of a fluid by compressing a resiliently deformable fluid path portion or releasing it from the compression.

2. Description of the Prior Art

As shown in FIGS. 24(a) and (b), a typical flow rate controller that is known to the relevant art, generally designated by 187, includes a fluid path 182 inside which a resiliently deformable sleeve 183, or simply a resilient sleeve, is mounted. In this construction, the resilient sleeve 183 has peripheral marginal edges 184 and 185 on the opposite sides thereof rigidly fixed to the inner wall of the fluid path 182, with a hollow space 186 formed between the inner wall of the fluid path 182 and the resilient sleeve 183. The flow rate of a fluid may be controlled by increasing or decreasing the pressure to be applied to the hollow space 186 to thereby vary the shape in cross section of the resilient sleeve 183.

According to the flow rate controller as described above, the fluid path 182 is completely closed by compressing the resilient sleeve 183 under pneumatic pressure applied thereto, as shown in FIGS. 24(c) and (d). This may disadvantageously cause fluid leaks or escapes through the compressed fluid path. Particularly when the fluid flows under high pressures, more leaks or escapes may occur. Furthermore, when the resilient sleeve 183 is placed in its intermediate (half open) state between the fully opened state, and fully closed state when the fluid flows under high pressures (FIGS. 24(a) and (b)), the resilient sleeve 183 may suffer small vibrations which cause the fluid to flow therethrough at varying rates.

SUMMARY OF THE INVENTION

In one aspect of the present invention, the problems described above in connection with the prior art are solved by providing a flow rate control by using a combination of a cylindrical roller and a retainer that are arranged to face opposite each other and hold a resiliently deformable fluid path portion (or simply a resilient portion) therebetween, the roller having a cutout on one side which is formed such that the distance from its rotary shaft to the outer wall of the roller on the side facing opposite the fluid path varies every time the roller rotates through a particular angle. The flow rate may be controlled by rotating the roller in this manner to press upon the resilient fluid path portion or to release it.

In another aspect of the present invention, those problems are also solved by providing a flow rate controller that includes a resilient fluid path and a combination of a cylindrical roller and retainer arranged to face opposite each other and hold a resiliently deformable fluid path portion (or simply a resilient portion) therebetween, the roller having a cutout on one side which is formed such that the distance from its rotary shaft to the outer wall of the roller on the side facing opposite the fluid path varies every time the roller rotates through a particular angle. The flow rate may be controlled by rotating the roller in this manner to press upon the resilient fluid path portion or to release it.

According to the method of the present invention, a first roller is provided in parallel with a retainer for holding a resilient fluid path together with the first roller. The first roller is rotated on its rotary shaft, and the distance from the rotary shaft to the outer wall of the first roller on the side facing the resilient fluid path portion may be varied every time the first roller rotates through a particular angle. The distance from the outer wall of the first roller on the side facing the resilient fluid path portion to the retainer on the side facing the opposite resilient fluid path portion may be varied accordingly. The shape in cross section of the resilient fluid path portion may be varied by varying this distance. The flow rate of the fluid that can flow through the resilient portion may be varied accordingly. Alternatively, a common roller may be provided for concurrently controlling the flow rates of the fluids that flow through several fluid paths. The retainer may be formed symmetrically to the first roller so that it provides a symmetric surface, and may also be provided to be rotatable.

According to the apparatus of the present invention, a casing is provided for accepting the resilient portion of the fluid path. In the casing, a first roller is provided in parallel with a retainer. The first roller is rotatably supported, and holds the resilient fluid path portion together with the retainer. The part of the first roller holding the resilient portion provides a control part, which is formed such that the distance from the rotary shaft of the first roller to the outer wall of the first roller on the side facing the resilient fluid path portion may be varied according to every predetermined angle through which the first roller rotates about its rotary shaft. The part of the retainer on the opposite side of the resilient fluid path portion facing the first roller is provided in parallel with the rotary shaft of the first roller. A single first roller may include several such control parts.

The retainer may be formed symmetrically to the first roller so that it provides a symmetric surface, and also may be rotatably supported. A first roller has a cylindrical form, and its control part includes a cutout formed on one side of the cylinder. The outer wall of the first roller on the side opposite the cutout is formed such that at least part of the outer wall of the first roller on the side opposite the cutout can engage the resilient fluid path portion when the first roller rotates about its rotary shaft. Alternatively, the first roller has the cylindrical form, and may be mounted center to its rotary shaft off its so that it can rotate eccentrically.

According to a variation of the apparatus, the first roller may include a peripheral guide track formed around its outer wall that always engages the outer peripheral wall of the resilient fluid path portion, and is formed so that it can follow any variation in the shape in cross section of the resilient fluid path portion that occurs when the first roller rotates about its rotary shaft. The rotary shaft supporting the first roller may be coupled with means for moving the rotary shaft. The means for moving the rotary shaft may comprise the rack and pinion arrangement in which the rotary shaft is connected with the pinion which engages the rack.

The peripheral guide track formed around the outer wall of the first roller as described above may be provided on either or both of first and second rollers, and may be formed like a strip that is raised on the surface or may be formed on the upper portion of the first roller that is diametrically enlarged to provide a raised surface.

The retainer is a roller having the cylindrical form as described, but may instead be provided by the wall surface of the casing in which the first roller is supported.

According to the method and apparatus of the invention as described so far, the resilient portion of the fluid path may be controlled by holding it between the outer wall on the control part of the first roller and the retainer in parallel with the first roller. There is no risk that the resilient portion held between the control part of the first roller and retainer will vibrate even if a fluid flows at the high velocity through the resilient fluid path portion. Thus, the flow rate of the fluid can be controlled accurately. When the resilient portion is to be closed fully, the outer wall on the control part of the first roller and the retainer can securely hold and press upon the resilient portion, and the resilient portion can be closed completely. Therefore, no fluid escape will occur and flow through the resilient portion even when the fluid is under the high pressures.

The first roller includes the peripheral guide track formed around the outer wall of the control part on the first roller that always engages the outer peripheral surface of the resilient portion of the fluid path and follows any variation in the shape in cross section of the resilient portion when the first roller rotates about its rotary shaft. This peripheral guide track ensures that the resilient portion can have the appropriate variations in shape in cross section when the shape in cross section of the resilient portion is varied by rotating the first roller. The fully closing and fully opening sequence maybe repeated: If this sequence is repeated by rotating a first roller which does not have such a peripheral guide track, it is possible that there may be irregularities in the variation in the shape in cross section of the resilient portion every time the sequence is repeated. The resilient portion may then gradually lose its resilience, and have to be replaced frequently. According to the present invention, the peripheral guide track on the first roller is provided for ensuring that the shape in cross section of the resilient portion can be varied appropriately in a predetermined shape by following the guide track when the sequence is repeated. Thus, the resilient portion will be able to retain its resilience, so there is no need of replacing it frequently.

The first roller may have several control parts, and the flow rates for the fluids through several fluid paths can be controlled by the combination of the first roller having several control parts and the retainer. This construction may provide multi-way valve functions. It may be apparent from the above description that the method and apparatus of the present invention may have a broad range of applications.

BRIEF DESCRIPTION OF THE DRAWINGS

These and other objects, features, and advantages of the present invention will become apparent from the detailed description of several preferred embodiments that will follow by reference to the accompanying drawings, in which:

FIG. 1(a)–(g) illustrates a roller in one preferred embodiment of the present invention, as well as the states in which the indexing motion of the roller occurs, in which FIG. 1(a) is a front view of the roller, and FIGS. 1(b) through (g) show respective sectional views of the roller taken along the line A—A in FIG. 1(a) when the roller is different states after it has rotated successively through every specific angle in the clockwise direction;

FIG. 2(a) is a longitudinal cross-sectional view of the roller arrangement in FIG. 2, and FIG. 2(b) is a sectional view of the roller arrangement taken along the line B—B in FIG. 2(a);

FIGS. 3(a)–(c) are illustrate a sectional views of the roller arrangement in FIGS. 2 that have rotated through every specific angle, in which FIG. 3(a) shows that the resilient fluid path portion opens fully, FIG. 3(b) shows that the resilient fluid path portion opens half way and FIG. 3(c) shows that the resilient fluid path portion closes fully;

FIGS. 4(a)–(c) shows a cross section of the rollers in the states shown in FIGS. 3, in which FIG. 4(a) is a sectional view taken along line C—C in FIG. 3(a), FIG. 4(b) is a sectional view taken along the line D—D in FIG. 3(b), and FIG. 4(c) is a sectional view taken along the line E—E in FIG. 3(c);

FIGS. 6(a)–(c) mounting of the rollers, in which FIG. 6(a) is a perspective view, FIG. 6(b) is a longitudinal section view, and FIG. 6(c) is a transversal section view;

FIGS. 1(b) through (d) are longitudinal cross sections of the rollers rotated through different specific angles;

FIGS. 10(a)–(c) illustrate a roller in another preferred embodiment, in which FIG. 10(a) is a front view, FIG. 10(b) is a sectional view taken along line F—F in FIG. 10(a), and FIG. 10(c) is a longitudinal cross-section view of a roller arrangement in this embodiment;

FIG. 11 illustrates a roller in a further preferred embodiment, as well as the states in an indexing motion of the roller, in which

FIGS. 12(a)–(c) illustrate a roller arrangement according to FIG. 11 that provides fluid filtering functions in which FIG. 12(a) shows a filtering process.

FIGS. 13(a)–(c) shows the roller arrangement according to another preferred embodiment, in which FIG. 13(a) is a perspective view, and FIGS. 13(b) and (c) illustrate a sectional view of this roller arrangement in different states;

FIGS. 14(a)–(d) show a roller arrangement according to another preferred embodiment, in which FIG. 14(a) is a front view, and FIGS. 14(b) through (d) are sectional views taken along line N—N through line R—R, showing the states of roller as rotated through angles of 120°;

FIGS. 15(a)–(c) illustrates the roller arrangement according to FIG. 14 that provides fluid filtering functions, in which FIG. 15(a) shows a filtering process, FIG. 15(b) shows a forward cleaning process, and FIG. 15(c) shows a backward cleaning process.

DESCRIPTION OF THE PREFERRED EMBODIMENTS

EXAMPLE 1

Figure 4A:
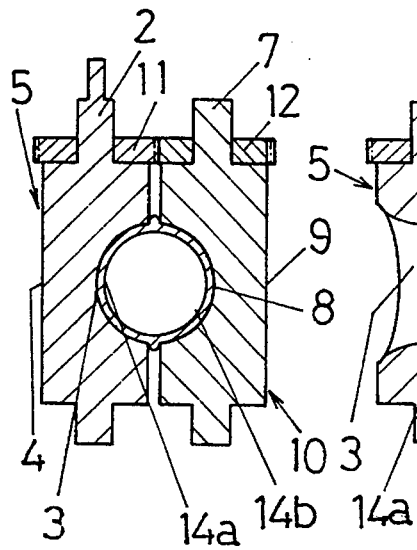

Referring first to FIGS. 1 through 5, a first preferred embodiment of the present invention is described.

A roller assembly, generally designated by 5, includes a roller 1 having a cylindrical form, and a central shaft 2 passing through the roller 1. The roller 1 has a cutout portion 3 formed centrally on one lateral side thereof and an engaging portion 4 on the opposite lateral side. See FIGS. 1(a) and (b).

Similarly, another roller assembly, generally designated by 10, includes a roller 6 having a cylindrical form, and a central shaft 7 passing through the roller 6. The roller 6 has a cutout portion 8 formed centrally on one lateral side thereof and an engaging portion 9 on the opposite lateral side. This is not shown in FIG. 1. Instead, it may be seen from FIG. 2. The roller assemblies 5 and 10 are symmetrical, and are operatively linked together.

A casing 15a houses the roller assemblies 5 and 10 whose respective shafts 2 and 7 are rotatably mounted to the casing 15a such that the roller assemblies are arranged in parallel and face opposite each other with a spacing therebetween. Each of the shafts 2 and 7 has a gear 11 and 12 rigidly fixed to one end thereof respectively. Those gears 11 and 12 mesh with each other. The shafts 2 and 7 are rotatably supported at both ends by the casing 15a. For example, the shaft 2 has an extension 2a on one side thereof, which projects out of the casing 15a. This extension 2a composes an operating part and may be coupled with an operating handle (not shown). A fluid path 13 that has a hollow cylindrical form includes a resiliently deformable portion 14 (or simply a resilient portion ) which is inserted between the central cutout portions 3 and 8 of the roller assemblies 5 and 10. The roller assemblies 5 and 10 and the resilient portion 14 together form a fluid controller 15 (FIG. 2). When the roller 5 and/or 10 is referred to hereinafter, it should be understood to include the respective roller assembly, unless othewise specified.

It may be seen from FIG. 1(b) that the roller 5 has a cross section as shown when it engages the resilient portion 14 of the fluid path 13. In the figure, the symbol "0" is the point of center in the central cutout portion of the roller 5, about which the roller 5 rotates clockwise. When the roller 5 is in the state shown in FIG. 1(b), the distance from the center point "0" to the outer wall of the roller 5 on the side engaging the resilient portion 14 of the fluid path 13 may be represented by L1. FIG. 1(c) indicates the state of the roller 5 that has rotated clockwise through an angle of 90°, beginning with the state shown in FIG. 1(b). In the state shown in FIG. 1(c), the distance from the center point "0" to the outer wall of the roller 5 on the side engaging the resilient portion 14 of the fluid path 13 may be represented by L2. In the state shown in FIG. 1(d), the distance from the center point "0" to the outer wall of the roller 5 on the side engaging the resilient portion 14 of the fluid path 13 may be represented by L3. L3 is equal to the radius of the roller 5. When the roller 5 is rotated clockwise further until it reaches the state shown in FIG. 1(f), beginning with the state shown in FIG. 1(d), the distance from the center point "0" to the outer wall of the roller 5 on the side engaging the resilient portion 14 of the fluid path 13 remains unchanged, namely, "L3". Thus, when the roller 5 is between the states (d) and (f) in FIG. 1, the resilient portion 14 of the fluid path 13 continues to be pressed upon most strongly by the roller 5. FIG. 1(e) and FIG. 1(g) indicate the states of the roller 5 that has rotated clockwise through 180° and 270°, respectively, beginning with the state in FIG. 1(b)

It may be seen from FIG. 1 that a part of the outer wall of the central cutout portion 3 of the roller B always engages the resilient portion 14 of the fluid path 13 while the roller 5 is rotating through every angle that corresponds to every state shown in FIG. 1. Therefore, when the roller 5 has completed one revolution, every part of the outer wall of the central cutout portion 3 of the roller 5 has engaged the resilient portion 14 at least one time. It is noted that the resilient portion 14 of the fluid path 13 may have any size e.g. a different diameter, and is not restricted to that shown in this embodiment. For example, the resilient portion 14 of the fluid path 13 may have a smaller diameter. In this case, there may be some parts of the outer wall of the central cutout portion of the roller 5 that do not engage the resilient portion 14 of the fluid path 13 when the roller 5 has rotated through one complete revolution. On the contrary, if the cutout portion is formed bigger than that shown in this embodiment, there may be some parts of the outer wall of the central cutout portion of the roller 5 that do not engage the resilient portion 14 of the fluid oath 13 when the roller 5 has rotated through one complete revolution in the before-mentioned case.

As described, the side of the roller 5 opposite the cutout portion will be referred to as the "engaging portion".

The angle of rotation of the roller 5 which is shown in FIG. 2(a), FIG. 3(a) and FIG. 4(a) will be referred to as the reference angle relative to all other possible angles. When the two rollers are at the reference angle with the center points aligned as shown in FIG. 2(a), FIG. 3(a) and FIG. 4(a), the cutout portions 3 and 8 on the rollers 5 and 10 face opposite each other so that the resilient portion 14 of the fluid path 13 retains its original shape, that is, the round shape in cross section (fully opened state). When the rollers rotate through 180°, beginning with the state of the reference angle, the resilient portion 14 will be held between the engaging portions 4 and 9 of the rollers 5 and 10 so that the opposite lateral sides 14a and 14b; of the resilient portion 14 facing the engaging portions 4 and 9 are pressed upon completely (fully closed state) as shown in FIG. 3(c) and FIG. 4(c). In this state, the fluid cannot flow through the resilient portion 14. The shapes of the cutout portions 2 and 8 and the gap between the two rollers 5 and 10 may be determined by considering the design and size of the resilient portion 14 of the fluid path 13 so that the resilient portion 14 can be controlled to maintain the above states.

The part of the roller 5 that consists of the cutout portion 3 and engaging portion 4 provides a control part 16, and the part of the roller 10 that consists of the cutout portion 8 and engaging portion 9 provides a control part 17.

The operation of the fluid flow controller 15 described above is described below.

When the operating part 2a on the roller 9 is rotated, which usually occurs by operating the handle (not shown) associated with the operating part 2a, the gear 11 on the roller 9 is rotated, causing the gear 12 in mesh with the gear 11 to rotate oppositely which causes the roller 10 to rotate. Thus, the rollers 5 and 10 rotate at the same speed but in the opposite directions.

Figure 4B:
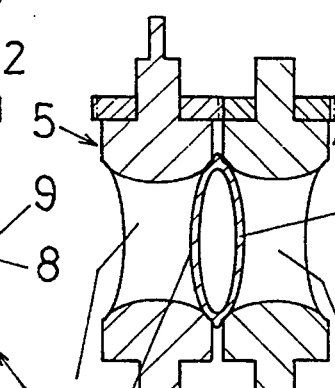
Figure 4C:
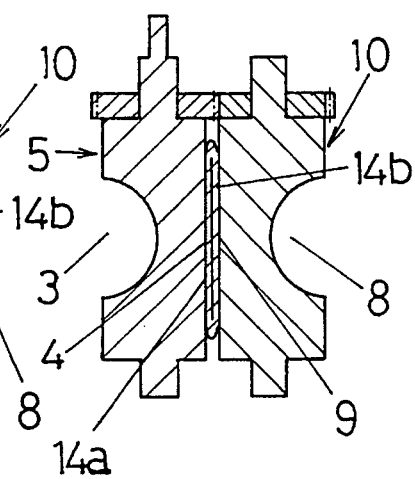

When the fluid path 13 is to be opened fully, the handle (not shown) is operated to rotate the operating part 2a on the roller 5, which causes the rollers 5 and 10 to rotate by means of the gears 11 and 12 so that the rollers 5, 10 are placed at the reference angle (FIG. 3a FIG. 4 (a)).

Conversely, when the fluid path 13 is to be closed fully, the handle (not shown) is operated so that the operating part 2a on the roller, which causes the rollers 5, 10 to rotate by means of the gears 11 and 12 so that the rollers 5 and 10 are rotated through 180°, beginning with the reference angle (FIG. 3(c) and FIG. 4(c)).

When the fluid path 13 is to be opened halfway the handle (not shown) is operated until the operating part 2a on the roller 5 is rotated to the intermediate state between the fully open state (reference angle) and the fully close state (180°). In this intermediate state, the shape in cross section of the resilient portion 14 is varied to allow the fluid to flow through the fluid path 13 at an appropriate rate. Then, the handle is stopped in its rest position. In this case, the resilient portion 14 of the fluid path 13 is firmly held between the engaging portions 4 and 9 of the rollers 5 and 10. Thus, there is no risk that the resilient portion 14 will vibrate even when the fluid flows at a high velocity.

Figure 5:
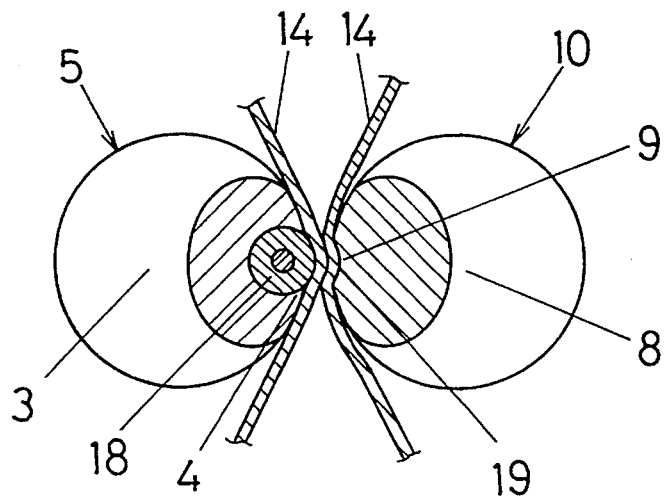
FIG. 5 is a sectional view of a roller arrangement in another embodiment.

This embodiment may be varied so that the engaging portion 4 on the roller 5 includes a smaller-diameter roller 18 as shown in FIG. 5. In this embodiment the engaging portion 9 on the roller 10 may include a recess 19 formed arcuately and having a diameter greater than the small roller 18 by the thickness of the resilient portion 14, as shown in FIG. 5. In this variation, when the fluid path 13 is to be closed fully, the resilient portion 14 may be held between the small roller 18 and the recess 19. This provides an improved sealing effect (see FIG. 5). This variation may advantageously be used with fluid under high pressures. This variation may be varied further so that the engaging portions 4 and 9 on both rollers 5 and 10 include smaller rollers, respectively. This may reduce the friction between the engaging portions 4 and 9 and the outer wall of the resilient portion 14, protecting the resilient portion 14 against any possible wear caused by the friction. This is not shown.

Figure 6A:
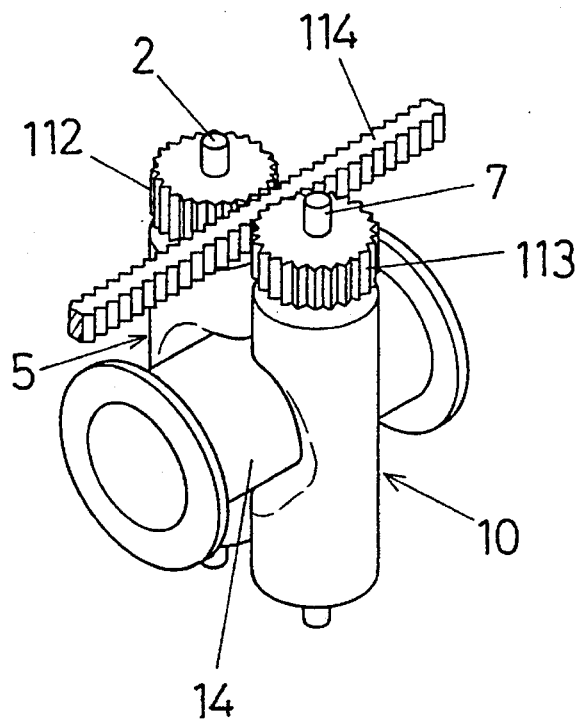
Figure 6B:
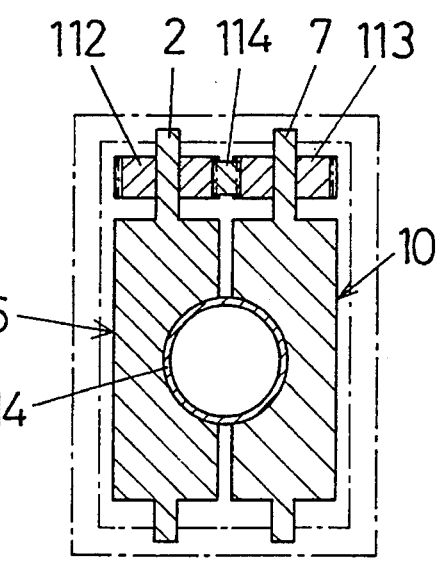
Figure 6C:
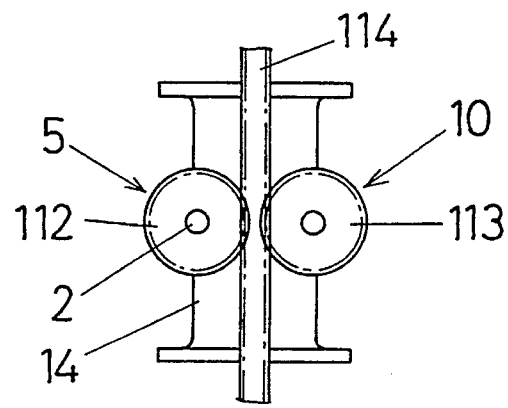

In the embodiment described so far, the operating handle (not shown) is associated with the operating part 2a of the roller 5, and the roller 5 may be rotated by the operating handle. This mechanical link may be replaced by the rack and pinion mechanism wherein pinions 112 and 113 may be mounted to the upper end of the shaft 2 supporting the roller 5 and to the upper end of the shaft 7 supporting the roller 10, respectively, and a rack 114 may be mounted between the pinions 112 and 113, the rack 114 having teeth on opposite sides thereof engaging the corresponding pinions 112, 113 (FIG. 6(a) and (b) and (c)). The pinions 112, 113 may be mounted to the lower ends of the respective shafts 2 and 7, but this is not shown. In alternative forms, the shaft supporting the operating part 2a may be coupled with an automatic rotation controller, or the rack 114 may be coupled with an automatic motion controller. In either way, the rollers 5 and 10 may be rotated automatically. This is not shown.

Figure 7:
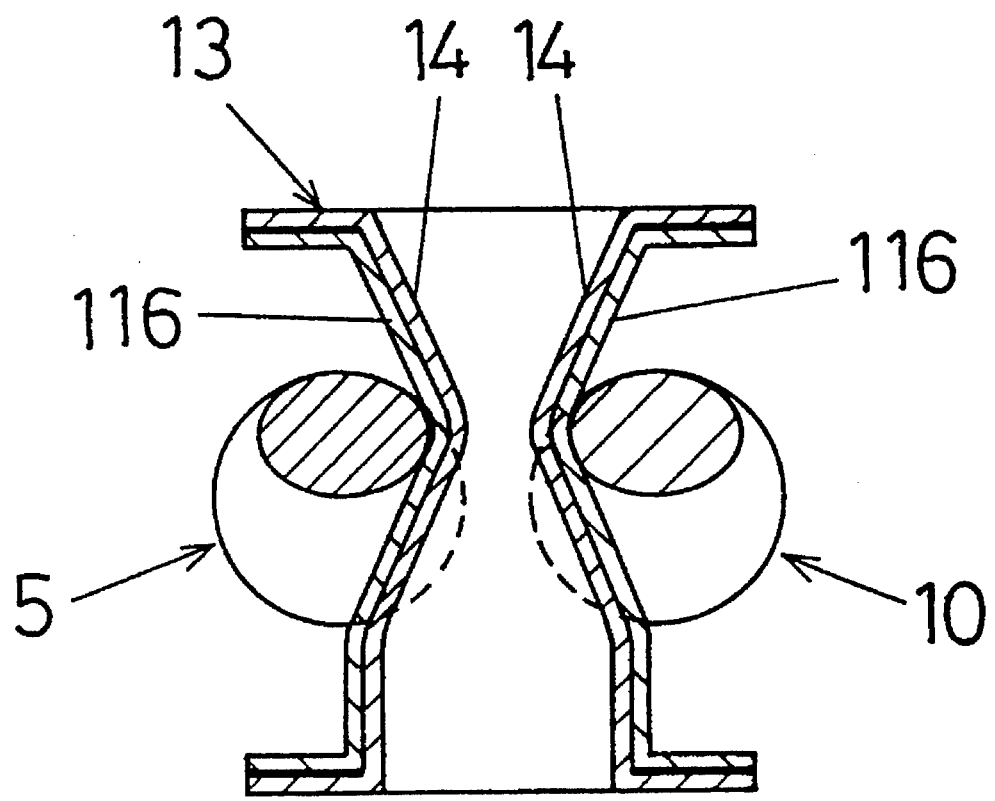
FIG. 7 is a sectional view of another embodiment including an intermediate film coating between the rollers and the resilient fluid path.

At least the area of each of the rollers 5 and 10 that engages the resilient portion 14 of the fluid path 13 may have a coating of Teflon or any other material that has a low friction coefficient. Alternatively, a thin film of Teflon or any other material that has a low coefficient may be provided on that area (not shown). It is also possible that a coating or film of Teflon or any other material that has a low friction coefficient is provided on the area of the resilient portion 14 of the fluid path 13 on which engaging the rollers 5 and 10. Furthermore, as shown in FIG. 7, a sheet 116 of Teflon or any other material that has a low friction coefficient may be provided between the rollers 5 and 10 and the resilient portion 14 of the fluid path 13.

Figure 8A:
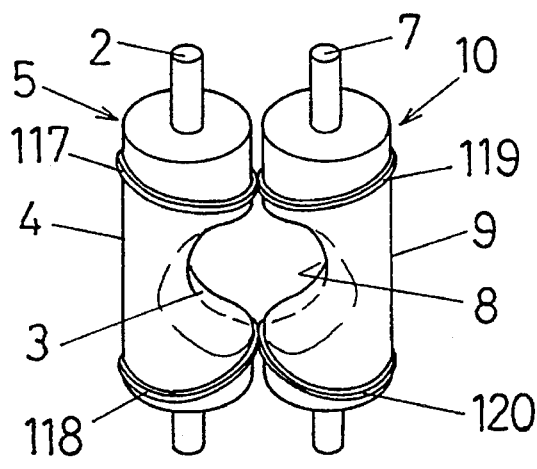
FIGS. 8(a)–(d) show another variation of the rollers including respective peripheral guide tracks, in which FIG. 8(a) a perspective view.
Figure 8B:
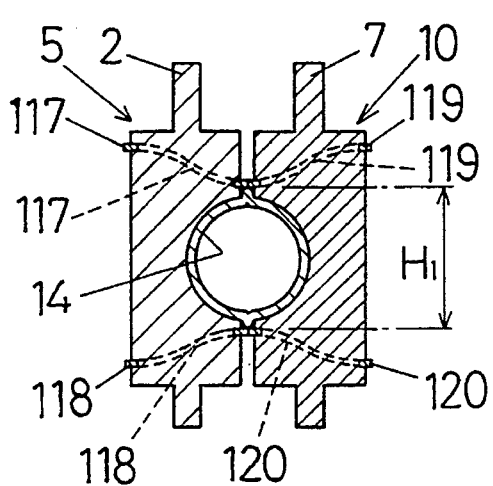
Figure 8C:
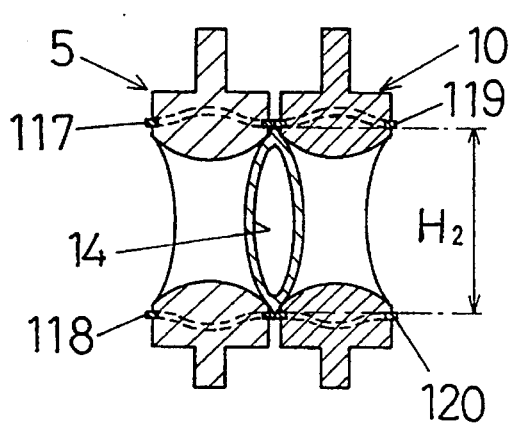
Figure 8D:
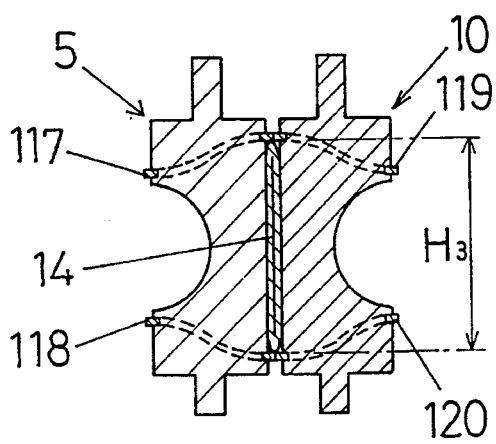

A variation of the embodiment described so far may be provided. In this variation, as shown in FIG. 8, peripheral guide tracks 117 and 118 and 119 and 120 may be formed around the rollers 5 and 10 above and below the cutouts 3 and 8 and engaging portions 4 and 9 thereof, respectively. These guide tracks. 117 and 118 and 119 and 120 are formed around the outer wall of respective rollers and always engage the outer peripheral wall of the resilient fluid path portion so that they can follow any variation in the shape in cross section of the resilient portion that occurs when the rollers rotate. FIG. 8(a) shows the guide tracks provided on both rollers 5 and 10. The distance H between the guide tracks 117 and 118 is varied in accordance with the variation in the shape in cross section of the resilient portion such that it corresponds to a height $H_1$ when the fluid path is opened fully (FIG. 8(b)), a height $H_2$ when the fluid path is opened halfway (FIG. 8(c)), and a height $H_3$ when the fluid path is closed fully (FIG. 8(d)).

As may be understood from the above, those guide tracks can follow the variations in the shape in cross section of the resilient portion 14 that occur from the fully closed state to the fully opened state as the rollers are rotating, and ensure that the resilient portion can have the appropriate variations in the shape in cross section when the shape in cross section of the resilient portion is varied by rotating the rollers.

Figure 9A:
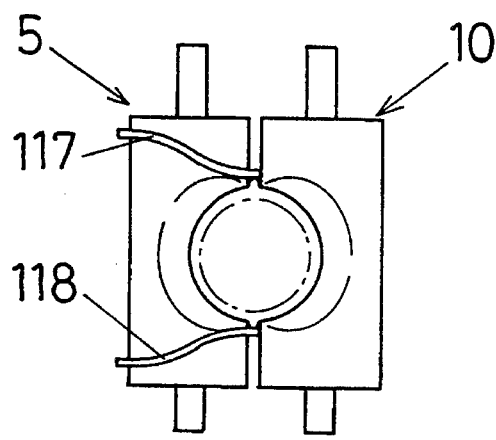
FIGS. 9(a) through (d) are front views of variations of the roller arrangement, each including peripheral guide tracks different other than those shown in FIG. 8.
Figure 9B:
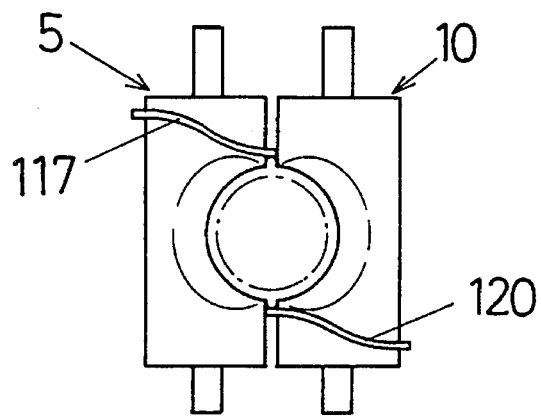
Figure 9C:
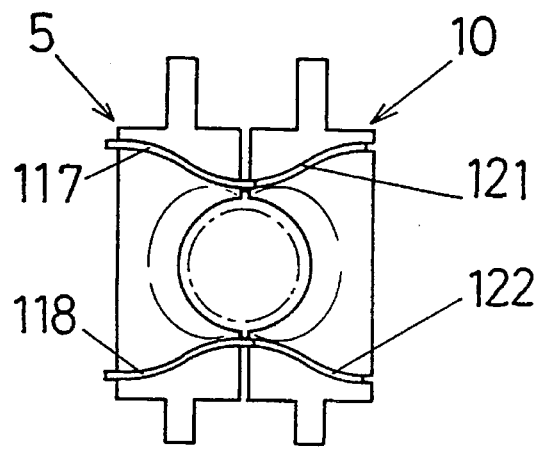
Figure 9D:
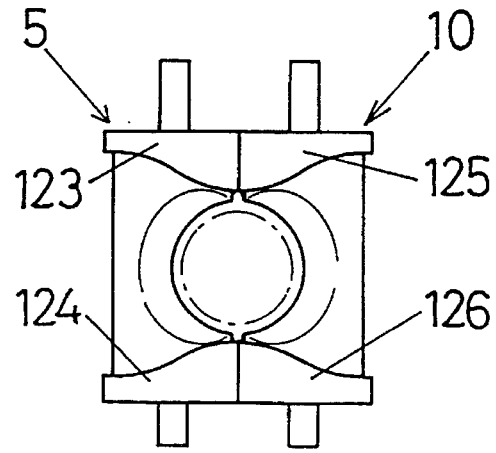
Figure 11A:
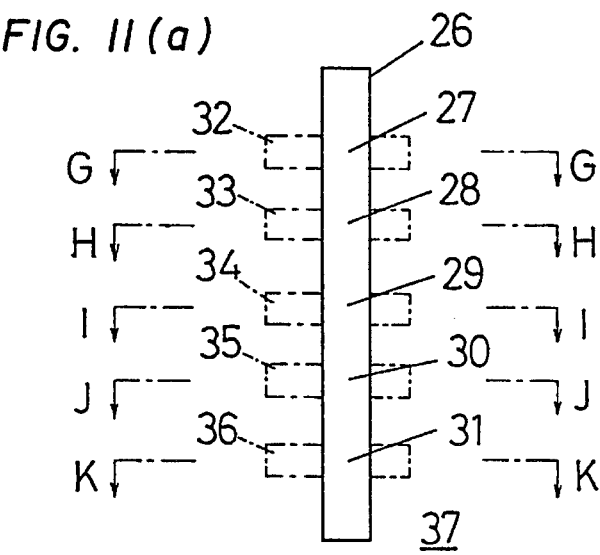
FIG. 11(a) is a front view.
Figure 11B:
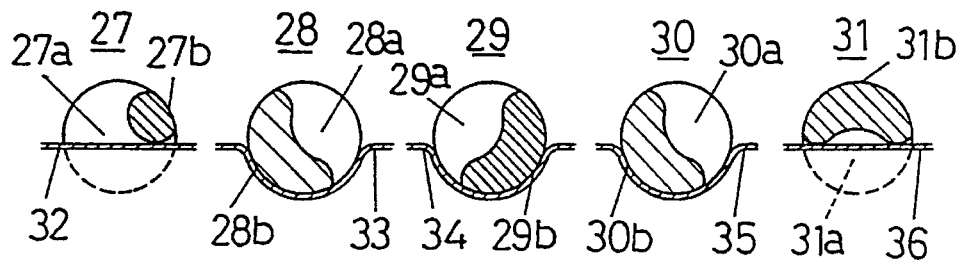
FIGS. 11(b) through (d) are sectional views taken along line G—G through the line K—K in FIG. 11 (a) when the roller is in the different states after it has rotated through every 120° angle.
Figure 11C:
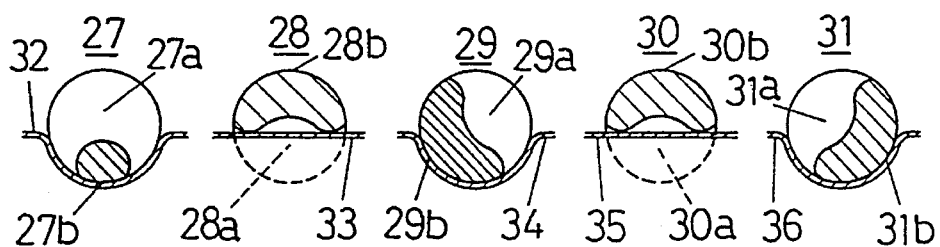
Figure 11D:
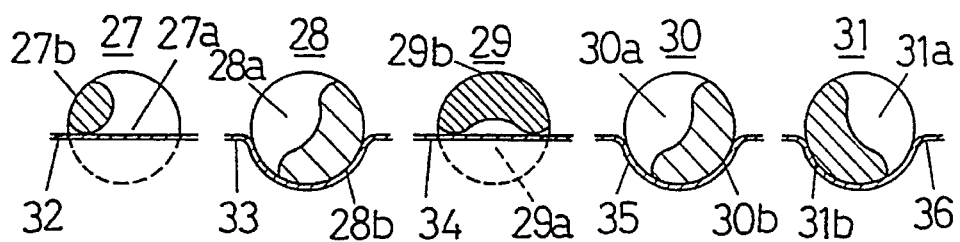

As described, the guide tracks are formed around both rollers, but may be provided on either of them, such as the guide tracks 117 and 118 on the roller 5 as shown in FIG. 9(a). It is possible that only the guide track 117 is provided on the roller 5, and only the guide track 120 is provided on the roller 10. It is also possible that the guide tracks 117 and 118 are provided on the roller 5, and corresponding recesses 121 and 122 that engage the guide tracks 117 and 118 are provided on the roller 10 (FIG. 9(c)). The roller 5 may include the diametrically enlarged portions 123 and 124 on the upper and lower sides, which are formed to provide the same configurations as the corresponding guide tracks 117 and 118 shown in FIG. 8(a). Similarly, the roller 10 may also be formed to include the diametrically enlarged portions 125 and 126 (FIG. 9(d)).

EXAMPLE 2

Referring next to FIGS. 10 through 12, another preferred embodiment of the present invention is described.

In the preceding embodiment (EXAMPLE 1), one roller has one control part. In the embodiment shown in FIGS. 11 through 13, a roller assembly 24 includes a roller 20 and a shaft 21 supporting the roller 20 wherein two control parts 22 and 23 are provided. The control part 22 includes a cutout 22a on one side, and an engaging portion 22b on the other side. Similarly, the control part 23 includes a cutout 23a on one side, and an engaging portion 23b on the other side. This may be seen from FIGS. 10 (a) and (b). A roller assembly 24a is similar to the roller assembly 24, and has a symmetrical surface. These roller assemblies 24 and 24a are supported rotatably within a casing 49a, and hold two fluid paths 25a and 25b therebetween. Thus, the flow rate controller 49 is provided as in the previous embodiment (FIG. 11(c)).

The flow rate controller 49 may be used for controlling the flow rates of tile fluids through the corresponding fluid paths 25a and 25b in the same manner as for the flow rate controller in the previous embodiment (EXAMPLE 1). As briefly described, when the roller assembly, or simply the roller 24, is assumed to be at the angle of 0° as shown in FIG. 10(c), the resilient portion of the fluid path 25a is held between the cutout 22a on the roller 24 and the corresponding cutout on the opposite roller 24a. In this state, the resilient portion of the fluid path 25a is opened fully, as shown in FIG. 10(c). At the same time, the resilient portion of the fluid path 25b is held between the engaging portion 23b on the roller 24 and the corresponding engaging portion on the opposite roller 24a, and the resilient portion of the fluid path 25b is closed fully as shown in FIG. 10(c). Then, when the roller 24 rotates through 180° as shown in FIG. 10(a), the resilient portion of the fluid path 25a is held between the engaging portion 22b on the roller 24 and the corresponding engaging portion on the opposite roller 24a, so the resilient portion of the fluid path 25a is closed fully. At the same time, the resilient portion of the fluid path 25b is held between the cutout 23a on the roller 24 and the corresponding cutout on the opposite roller 24a, so the resilient portion of the fluid path 25b is opened fully. In this way, the two control parts on the single roller 24 can control the flow rates of the two fluids through the fluid paths 25a and 25b.

The following example is the case where the roller has a number of control parts. Specifically, the flow rate controller includes a roller that has five control parts, and may be used as a fluid filtering apparatus as shown in FIG. 11. This roller arrangement is described below with the aid of FIG. 11 and FIG. 12.

A first roller assembly, generally designated by 37, includes a cylindrical roller 26 that has five control parts 27 through 31. Each of the control parts 27–31 has a respective one of the cutouts 27a–31a on one side thereof, and has a respective one of engaging portions 27b–31b.

A second roller assembly, not shown, is provided opposite the first roller assembly 37 and has the identical and symmetrical roller arrangement. Each of resilient portions 32 through 36 of a number of fluid paths is held between the corresponding one of the control parts 27–31 on the first roller 37 and the corresponding one of the control parts on the second roller (not shown). The first and second roller assemblies constitute the flow rate controller 38.

The flow rate controller 38 operates such that it controls the flow rates of the fluids through the resilient portions 32–36 of the fluid path by rotating the first roller 37 and the second roller through the angles of 0° ("X" position), 120° ("Y" position) and 240° ("Z" position) to enable each of the control parts 27–31 to act upon each corresponding one of the resilient portions, thereby varying the shape in cross section of each corresponding one of the resilient portions so the flow rates of the fluids through the resilient portions 32–36 can be controlled. When the roller 37 is at the angle of 0° ("X" position), the state for each of the control parts 27–31 is shown in cross section in FIG. 11(b). In the "X" position, the control parts 27 and 31 enable the corresponding resilient portions 32 and 36 to be opened fully, through which the respective fluids can flow, whereas the remaining control parts 28, 29 and 30 enable the corresponding resilient portions 33, 34 and 35 to be closed fully, through which the respective fluids cannot flow. Then, when the roller 37 rotates further through 120° ("Y" position), the state for each of the control parts 27–31 is shown in Gross section in FIG. 11(c). In the "Y" position, the control parts 28 and 30 enable the corresponding resilient portions 33 and 35 to be opened fully, through which the respective fluids can flow, whereas the remaining control parts 27, 29 and 31 enable the corresponding resilient portions 32, 34 and 36 to be closed fully, through which the respective fluids cannot flow. When the roller 37 rotates further through 120° (a total of 240°) ("Z" position), the state for each of the control parts 27–31 is shown in cross section in FIG. 11(d). In the "Z" position, the control parts 27 and 29 enable the corresponding resilient portions 32 and 34 to be opened fully, through which the respective fluids can flow, whereas the remaining control parts 28, 30 and 31 enable the corresponding resilient portions 33, 35 and 36 to be closed fully, through which the respective fluids cannot flow.

Each of the control parts 27–31, has a cutout that cooperates with the respective engaging portion for controlling the flow rate of the fluid through the respective resilient portion by opening or closing it fully, when the roller is at the angles of 0° ("X" position), 120° ("Y" position), and 240° ("Z" position).

In a flow rate controller 38, the roller 26 in the first roller assembly 37 and the second roller in the first roller assembly 37 (not shown) which is symmetrical to the first roller 26 are supported by respective stationary shafts which are fixed in their respective positions each time the rollers rotates to the "X", "Y" and "Z" positions.

Figure 12A:
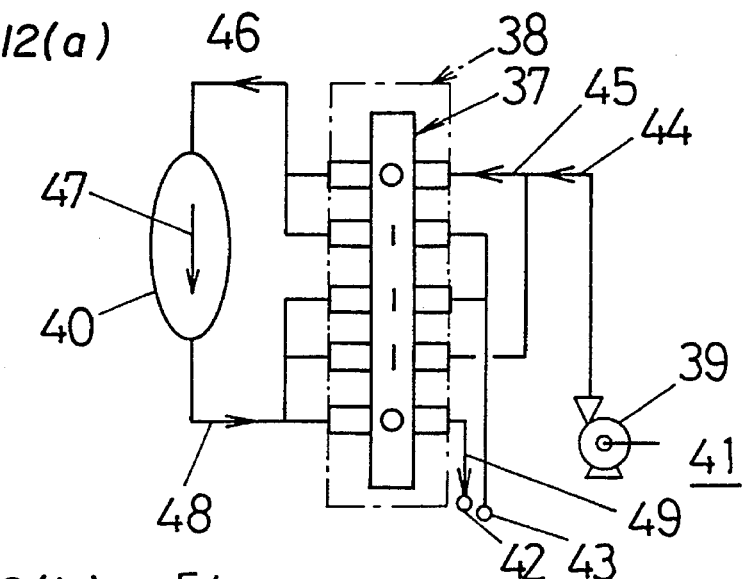

As shown in FIG. 12(a), a fluid filtering apparatus 41 may be constructed by coupling a pump 39 and a filtering tank 40 with the flow rate controller 38 by means of a fluid path or conduit. In the schematic diagram shown in FIG. 13, 42 designates a processed fluid outlet port, and 43 designates a liquid cleaner outlet port.

When the flow rate controller 38 is in a filtering process ("X" position) as shown in FIG. 12(a), a fluid to be filtered is delivered from the pump 39 into the fluid rate controller 38 as indicated by arrows 44 and 45, from which the fluid is delivered to the filtering tank 40 as indicated by an arrow 46, and through which the fluid is filtered as indicated by an arrow 47. The filtered fluid is then fed back to the flow rate controller 38 again as indicated by an arrow 48, from which it goes out through the processed fluid outlet port 42 as indicated by an arrow 49.

Figure 12B:
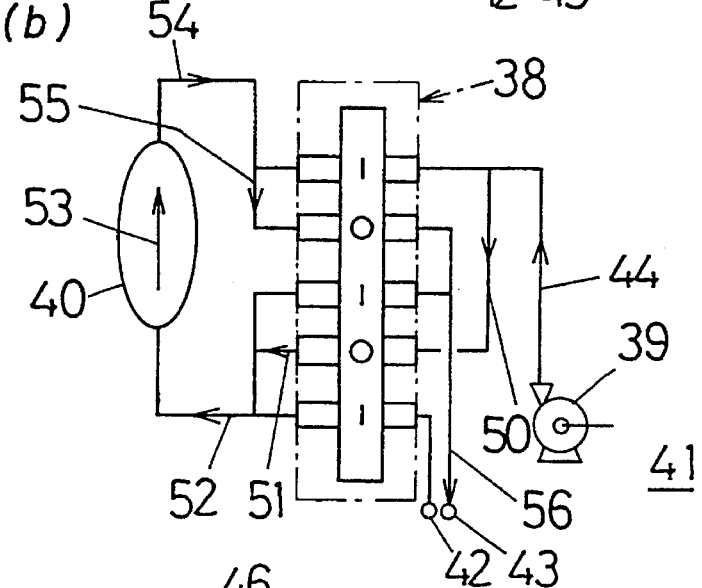

When the flow rate controller 38 is in a backward cleaning process ("Y" position) as shown in FIG. 12(b), the liquid cleaner is delivered from the pump 39 into the flow rate controller 38 as indicated by arrows 44 and 50, from which the liquid cleaner is delivered to the filtering tank 40 as indicated by arrows 51 and 52 where the interior of the the filtering tank 40 is cleaned as indicated by an arrow 53. The liquid cleaner goes back into the flow rate controller 38 as indicated by arrows 54 and 55, from which it goes out through the outlet port 43 as indicated by an arrow 56.

Figure 12C:
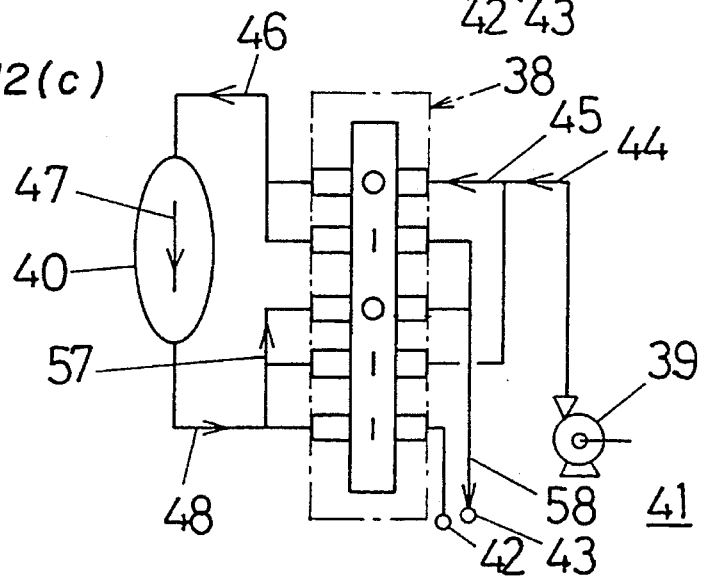

When the flow rate controller 38 is in a forward cleaning process ("Z" position) as shown in FIG. 12(c), the liquid cleaner is delivered from the pump 39 into the flow rate controller 38 as indicated by arrows 44 and 45, from which the liquid cleaner is delivered to the filtering tank 40 as indicated by an arrow 46 and where the filtering tank 40 is cleaned as indicated by an arrow 47. The liquid cleaner goes back into the flow rate controller 38 as indicated by arrows 48 and 57, from which it goes out through the outlet port 43 as indicated by an arrow 58.

The above processes may be repeated for the fluid to be filtered next, upon completion of the forward cleaning process.

EXAMPLE 3

Referring next to FIGS. 13 through 15, another preferred embodiment of the present invention is described. In all of the preceding embodiments, the rollers are rotated about their respective stationary shafts. According to the current embodiment, the flow rate of the fluid can be controlled by rotating the roller while its shaft is being moved.

The roller assembly in this embodiment is similar to that in the embodiment shown in FIG. 2, except that the shaft 2 for the roller 5 providing the control part 16 and the shaft 7 for the roller 10 providing the control part 17 have pinions 112 and 113 fixed to their respective upper ends, and a rack 114 is disposed between the two pinions 112 and 113, the rack 114 having teeth on the opposite sides that are in mesh with the corresponding pinions 112 and 113. Outside the pinion 112, a stationary rack 156 is provided in parallel with the rack 114 and is fixed to the casing 15a. Similarly, outside the pinion 113, a stationary rack 157 is provided in parallel with the rack 114, and is fixed to the casing 15a. Those racks 156 and 157 are in mesh with the corresponding pinions 112 and 113. Parallel tracks 154 and 155 are provided in the bottom across the casing 15a for accepting the bottom ends of the corresponding shafts 2 and 7 the rollers 5 and 10 so that the shafts can travel along the respective tracks 154 and 157.

Figure 13A:
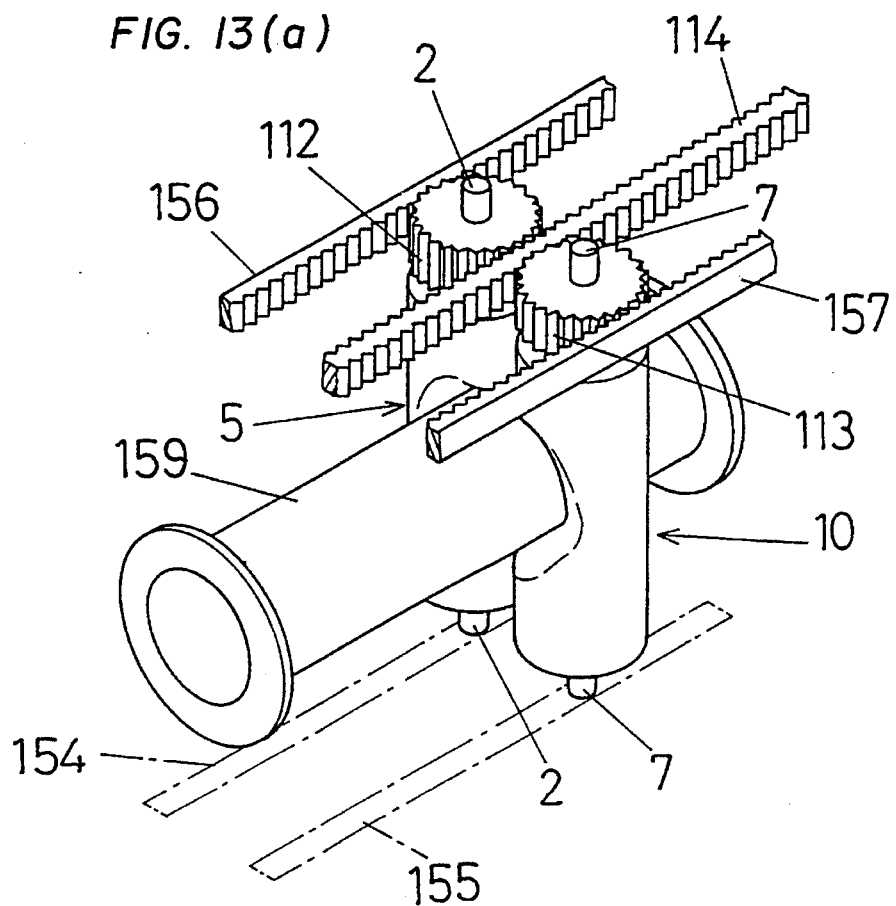

The resilient portion 159 of the fluid path 158 is held between the rollers 5 and 10, which constitutes a flow rate controller 161 (FIG. 13(a), (b), (c)).

The operation of the flow rate controller 161 according to the current embodiment is now described.

Figure 13B:
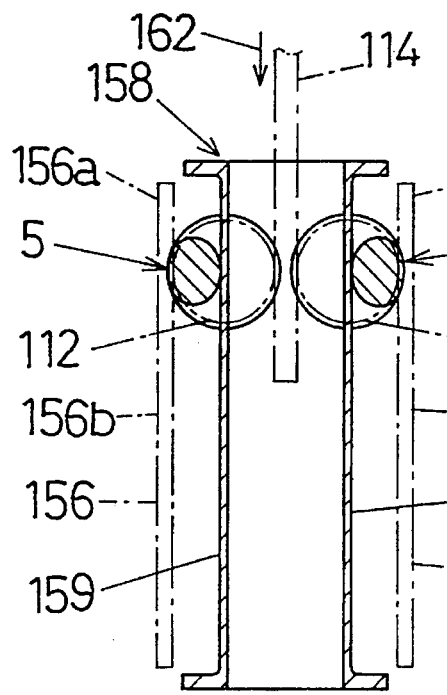
FIG. 13(b) shows a backward cleaning process.
Figure 13C:
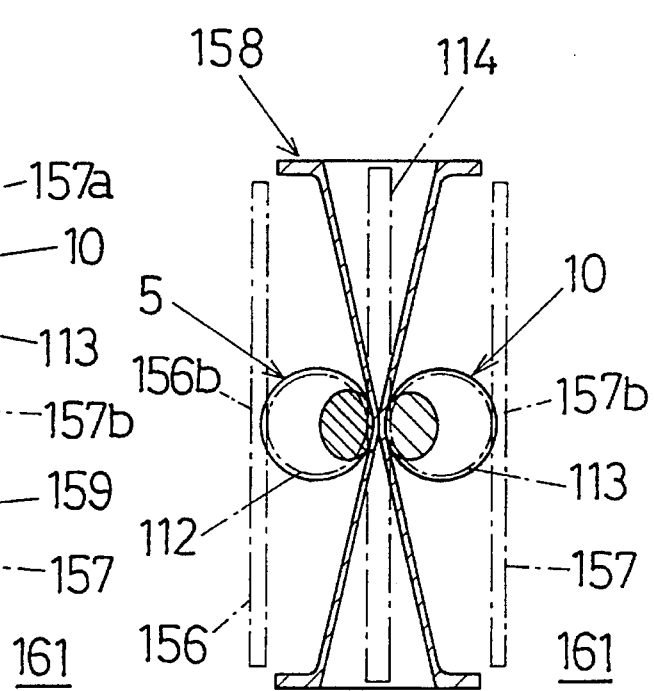
FIG. 13(c) shows a forward cleaning process.

When each of the pinions 112 and 113 is placed on one side of 156a and 157a of the respective stationary racks 156 and 157 as shown in FIG. 13(b), the resilient portion 159 is located inside the cutouts 3 and 8 on the rollers 5 and 10, so it is in its fully open state. Then, when the rack 114 is moved from the position shown in FIG. 13(b) in the direction of an arrow 162, the rollers 5 and 10 are rolling until they reach the position shown in FIG. 13(c) where the pinions 112 and 113 are placed on a middle way 156b and 157b of the stationary racks 156 and 157. In this position, the resilient portion 159 is pressed against by the engaging portions 4 and 9, so it is in its fully closed state. When the rollers 5 and 10 are placed between the positions shown in FIG. 13(b) and FIG. 13(c), the resilient portion 159 is in its half open state. The flow rate of the fluid can be controlled in this manner.

The stationary racks 156 and 157 may be replaced by tracks similar to the tracks 154 and 156 that may be formed at the top across the casing for supporting the shafts 2, 7. This is not shown.

The flow rate controller 161 according to the current embodiment may be applied to a fluid filtering apparatus, as described below.

As shown in FIGS. 14 a cylindrical roller 163 has four control parts 164 through 167. The control parts 164 through 167 include respective cutouts 164a through 167a on one side thereof, and respective engaging portions 164b through 167b on the opposite side thereof.

Another cylindrical roller that is symmetrical to the above roller 163 is provided (which is not shown), and resilient portions 169 through 172 of a fluid path 168 corresponding to the control parts 164 through 167 are held between the roller 163 and the other roller (not shown). The roller assembly consisting of the rollers as described is mounted within a casing, which thus provides a flow rate controller 173.

The roller 163 and the other symmetrical roller (not shown) that holds the resilient portions 169 through 172 of the fluid path 168 together with the roller 163 have a rack and pinion arrangement as described in connection with the preceding embodiment shown in FIG. 21.

Figure 14A:
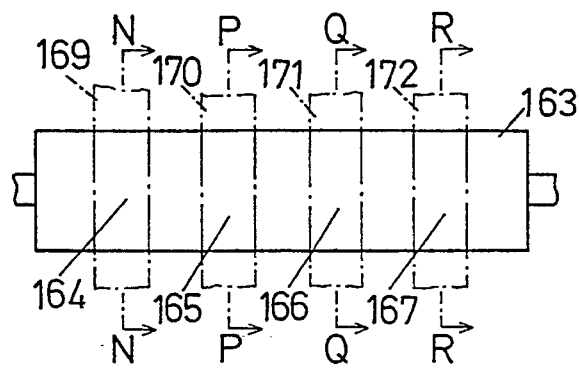
Figure 14B:
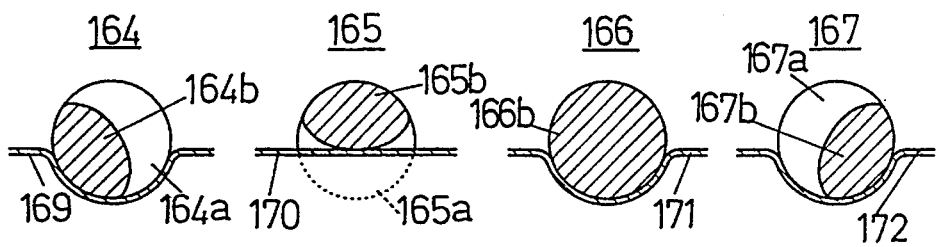
Figure 14C:
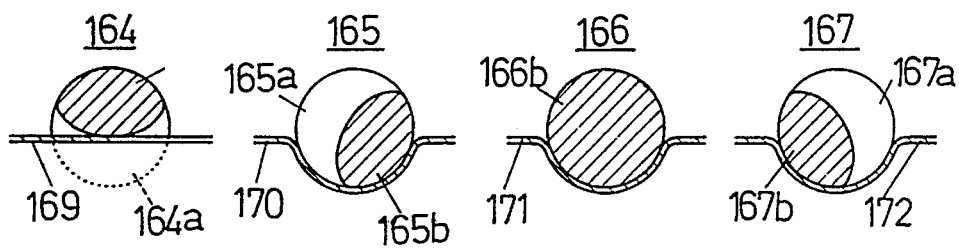
Figure 14D:
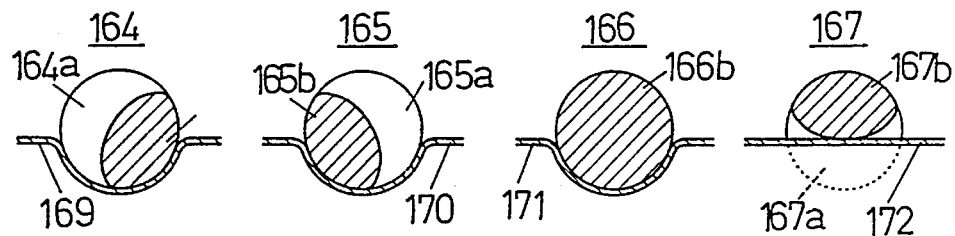
Figure 16A:
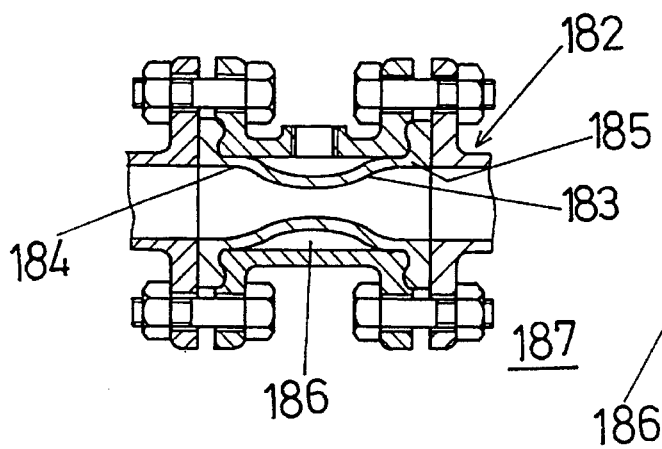
FIGS. 16(a) and (c) represent sectional views of a typical prior art roller arrangement, FIG. 16(b) corresponds to FIG. 16(a), showing a longitudinal section view, and FIG. 16(d) corresponds to FIG. 16(c), showing a longitudinal section view.
Figure 16B:
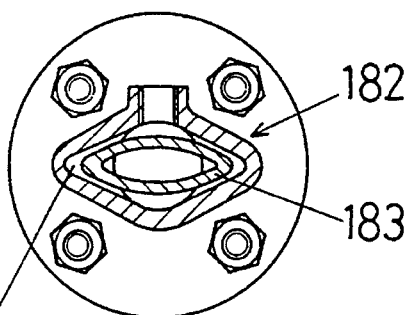
Figure 16C:
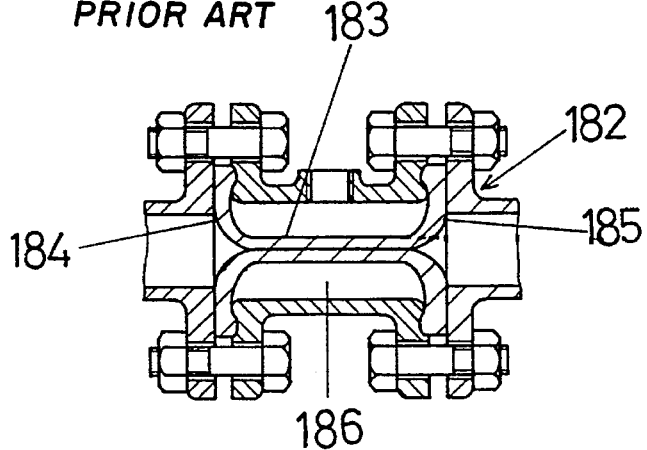
Figure 16D:
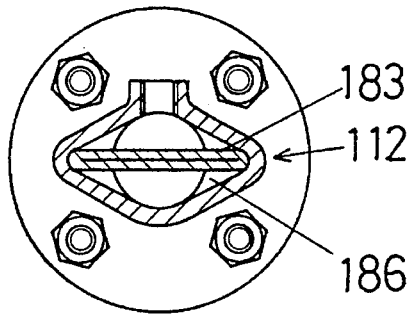

The flow rate controller 173 controls the flow rate of the fluid through the resilient portions 169 through 172 of the fluid path by causing the roller 163 and the other roller to rotate through 0° ("X" position), 120° ("Y" position), and 240° ("Z" position), respectively, and by enabling each one of the control parts 164 through 167 to act upon each corresponding one of the resilient portions 169 through 172. When the roller 163 is at the angle of 0° ("X" position), each of the control parts 164 through 167 has the shape in cross section as shown in FIG. 14(b). In the "X" position, the control part 165 has no effect upon the corresponding resilient portion 170 of the fluid path 168 (fully open state), allowing the fluid to flow through the resilient portion 170, while the remaining control parts 164, 166, and 167 enable the corresponding resilient portions 169, 171 and 172 to be closed fully, inhibiting the flow of the fluid through those resilient portions. When the roller 163 rotates through 120° ("Y" position), each of the control parts 164 through 167 has the shade in cross section as shown in FIG. 14(c). In the "Y" position, the control part 164 has no effect upon the corresponding resilient portion 169 of the fluid path 168 (fully open state), allowing the flow of the fluid through the resilient portion 169, while the remaining control parts 165, 166, and 167 enable the corresponding resilient portions 170, 171, and 172 to be closed fully, inhibiting the flow of the fluid through those resilient portions. When the roller 163 rotates further through 120° (a total of 240°) ("Z" position), each of the control parts 164 through 167 has the shape in cross section as shown in FIG. 14(d). In the "Z" position, the control part 167 has no effect upon the corresponding resilient portion 172 of the fluid path 168 (fully open state), allowing the flow of the fluid through the resilient portion 172, while the remaining control parts 164, 165, and 166 enable the corresponding resilient portions 169, 170, and 171 to be closed fully, inhibiting the flow of the fluid through those resilient portions.

It may be appreciated that each of the control parts 164 through 167 of the roller 163 and another symmetrical roller also includes a cutout that acts upon the corresponding resilient portion of the fluid path to enable it to be opened fully or closed fully, when the roller rotates through 0° ("X" position), 120° ("Y" position), and 240° ("Z" position).

The resilient portion 169 has an exit port 174, the resilient portion 170 has a processed fluid outlet port 175, the resilient portion 171 has an inlet port 177 through which a fluid to be processed and a liquid cleaner are delivered, a port 176 connected to one side (upper) of a filtering tank 180 and a port 179 connected to the other side (lower) of the filtering tank 180, and the resilient portion 172 has an exit port 178. Those connections are shown in FIG. 15(a).

When the roller assembly 163 is in the "X" position as shown in FIG. 15(a), it is in a fluid filtering process during which a fluid to be processed enters through the port 177, going through the resilient portions 172, 171 and then into the filtering tank 180 where the fluid is filtered via the upper side through the port 176, where the fluid is filtered. The filtered fluid goes out from the filtering tank 180, entering the resilient portion 170 through the port 179 and then going out through the port 175. These flows are indicated by the respective arrows.

Then the roller assembly 163 is rolled from the "X" position (as shown in FIG. 15(a)) through 120° to the "Y" position as shown in FIG. 15 (b). This position represents the cleaning process during which, as indicated by the respective arrows in FIG. 15(b), the liquid cleaner enters through the port 177, going through the resilient portion 171 and then through the port 176 into the filtering tank 180 via the upper side from which the cleaner enters through the port 179 back into the resilient portion 169, the cleaner goes out through the port 174.

Finally, the roller assembly 163 is rolled from the "Y" position (as shown in FIG. 15(b)) through an additional 120° to the "Z" position as shown in FIG. 15(c). This position represents the backward cleaning process during which, as indicated by the respective arrows in FIG. 23 (c), the cleaner enters through the port 177, going through the resilient portion 171 and then through the port 179 into the filtering tank 180 via the lower side where the backward cleaning occurs. Then the cleaner enters through the port 176 back into the resilient portion 172 and then going out through the port 178.

The flow rate control may proceed as described above, and this procedure may be repeated by operating the roller assembly as described above.

In the embodiment described in connection with FIG. 15, the roller assembly 163 cooperates with its counterpart symmetrical roller assembly (not shown) to hold the resilient portions 169 through 172 therebetween and thereby control their respective fluid flows. This embodiment may be modified so that the roller assembly 163 may cooperate with the casing wall, rather than its couterpart roller assembly, to hold the resilient portions 169 through 172 and thereby control their respective fluid flows, although this is not shown. In this case, the casing wall that engages the resilient portions may have a flat or curved surface. The roller assembly 163 can roll along the appropriate configuration of the casing wall.

Although the present invention has been described in connection with the preferred embodiments thereof, it should be understood that various changes and modifications may be made without departing from the spirit and scope of the invention as defined in the appended claims.

What is claimed is:

1. An apparatus for controlling the flow rate of a fluid flowing through a fluid path at least partially defined by a resiliently deformable conduit portion, comprising:

a casing having said resiliently deformable conduit portion extending therethrough;

a first roller and a second roller both rotatably supported in said casing by respective rotary shafts located along respective longitudinal axes of said first and second rollers in said casing, said first roller and said second roller having said resiliently deformable conduit portion therebetween; and a control surface defined on said first roller for pressing said resiliently deformable conduit portion toward said second roller to control fluid flow through said conduit portion, said control surface comprising a first surface portion that is curved as viewed in section, the section being taken perpendicular to said rotary shaft of said first roller, and said first surface portion engaging and closing said resiliently deformable conduit portion in a closed position of said first roller, and a second surface portion that is curved as viewed in section, the section being taken perpendicular to said rotary shaft of said first roller, said second surface portion being positioned along one side of said resiliently deformable conduit portion in an open position of said first roller;

wherein said first and second surface portions of said control surface of said first roller are located at the same axial position along said first roller, and wherein said first and second surface portions are at least partially located at different radial distances from said longitudinal axis of said first roller;

wherein said first roller has a plurality of said control surfaces thereon; and wherein said second roller is symmetrical with respect to said first roller, said second roller being rotatably mounted in said casing parallel to said first roller.

2. The apparatus of claim 1, wherein said first and second rollers are symmetrical about a plane extending therebetween.

3. The apparatus of claim 1, wherein said second roller has control surfaces thereon at positions corresponding to said control surfaces of said first roller.

4. The apparatus of claim 3, wherein said control surfaces of each of said first and second rollers are axially distributed along said rollers in the direction of said rotary shaft.

5. The apparatus of claim 3, wherein said control surfaces on said first roller have said first surface portions thereof located at more than one radial position on said first roller.

6. The apparatus of claim 1, wherein said second surface portion of each said control surface on each said roller has a radial distance from said longitudinal axis of the respective said roller that varies both circumferentially about said roller and longitudinally of said roller.

7. An apparatus for controlling the flow rate of a fluid flowing through a fluid path at least partially defined by a resiliently deformable conduit portion, comprising:

a casing having said resiliently deformable conduit portion extending therethrough;

a first roller and a second roller both rotatably supported in said casing by respective rotary shafts located along respective longitudinal axes of said first and second rollers in said casing, said first roller and said second roller having said resiliently deformable conduit portion therebetween; and a control surface defined on said first roller for pressing said resiliently deformable conduit portion toward said second roller to control fluid flow through said conduit portion, said control surface comprising a first surface portion that is curved as viewed in section, the section being taken perpendicular to said rotary shaft of said first roller, and said first surface portion engaging and closing said resiliently deformable conduit portion in a closed position of said first roller, and a second surface portion that is curved as viewed in section, the section being taken perpendicular to said rotary shaft of said first roller, said second surface portion being positioned along one side of said resiliently deformable conduit portion in an open position of said first roller;

wherein said first and second surface portions of said control surface are located on opposite sides of said first roller with respect to said longitudinal axis thereof;

wherein said first roller has a plurality of said control surfaces thereon; and wherein said second roller is symmetrical with respect to said first roller, said second roller being rotatably mounted in said casing parallel to said first roller.

8. The apparatus of claim 7, wherein said first and second rollers are symmetrical about a plane extending therebetween.

9. The apparatus of claim 7, wherein said second roller has control surfaces thereon at positions corresponding to said control surfaces of said first roller.

10. The apparatus of claim 7, wherein said control surfaces of each of said first and second rollers are axially distributed along said rollers in the direction of said rotary shaft.

11. The apparatus of claim 7, wherein said control surfaces on said first roller have said first surface portions thereof located at more than one radial position on said first roller.

12. The apparatus of claim 7, wherein said second surface portion of each said control surface on each said roller has a radial distance from said longitudinal axis of the respective said roller that varies both circumferentially about said roller and longitudinally of said roller.

13. The apparatus of claim 7, wherein said first and second surface portions of said control surface of said first roller are located at the same axial position along said first roller, and wherein said first and second surface portions are at least partially located at different radial distances from said longitudinal axis of said first roller.

* * * * *